(12) United States Patent
Buell et al.

(10) Patent No.: US 8,950,539 B2
(45) Date of Patent: Feb. 10, 2015

(54) LIGHTWEIGHT INTEGRATED REAR SUSPENSION AND DRIVE ENCLOSURE FOR A RIDDEN MOTORIZED VEHICLE

(71) Applicants: Erik Buell, Mukwonago, WI (US);
Anthony Stefanelli, Elkhorn, WI (US);
John Fox, Mukwonago, WI (US);
Jonathan Bunne, Elkhorn, WI (US);
Giancarlo Battaglini, Eagel, WI (US);
Chad Antczak, Waukesha, WI (US);
Dean Iwinski, Musekgo, WI (US)

(72) Inventors: Erik Buell, Mukwonago, WI (US);
Anthony Stefanelli, Elkhorn, WI (US);
John Fox, Mukwonago, WI (US);
Jonathan Bunne, Elkhorn, WI (US);
Giancarlo Battaglini, Eagel, WI (US);
Chad Antczak, Waukesha, WI (US);
Dean Iwinski, Musekgo, WI (US)

(73) Assignee: Hero Motorcorp Ltd., New Delhi (IN)

( * ) Notice: Subject to any disclaimer, the term of this patent is extended or adjusted under 35 U.S.C. 154(b) by 62 days.

(21) Appl. No.: 13/731,074

(22) Filed: Dec. 30, 2012

(65) Prior Publication Data

US 2013/0168172 A1      Jul. 4, 2013

Related U.S. Application Data

(60) Provisional application No. 61/582,814, filed on Jan. 3, 2012.

(51) Int. Cl.
| | |
|---|---|
| *B62K 25/02* | (2006.01) |
| *B62K 11/00* | (2006.01) |
| *B62K 25/28* | (2006.01) |
| *B62K 11/04* | (2006.01) |

(52) U.S. Cl.
CPC ............... *B62K 11/00* (2013.01); *B62K 25/283* (2013.01); *B62K 11/04* (2013.01); *B62K 2202/00* (2013.01)
USPC .......................................... 180/227; 180/220

(58) Field of Classification Search
USPC .................................. 180/218–221, 227, 231
See application file for complete search history.

(56) References Cited

U.S. PATENT DOCUMENTS

| | | | |
|---|---|---|---|
| 3,252,537 A | 5/1966 | Tarran | |
| 3,269,480 A | 8/1966 | Kirby | |
| 3,724,582 A | * 4/1973 | Wood | 180/219 |

(Continued)

FOREIGN PATENT DOCUMENTS

| | | |
|---|---|---|
| EP | 1396418 | 3/2004 |
| EP | 1707479 | 10/2006 |

(Continued)

OTHER PUBLICATIONS

Abstract of Japanese Patent No. 07-117774 (English Machine Translation).

(Continued)

*Primary Examiner* — Tony Winner
(74) *Attorney, Agent, or Firm* — Hahn Loeser + Parks LLP; Arland T. Stein

(57) ABSTRACT

A ridden motorized vehicle such as a motorized scooter, motorcycle, ATV, tricycle, snowmobile, or lawn tractor, having a driven rear wheel may be equipped with an enclosed chain or belt drive enclosure having a first end and a second end and an inner enclosure and an outer enclosure, such that the inner enclosure has the rear suspension member and the rear wheel mounted at the second end, and concentrically pivots at the first end on the motor assembly output shaft of a motor assembly fastened to or comprising part of the main vehicle frame, and the outer enclosure pivoted on another bearing co-linear with the motor assembly output shaft, but mounted on a removable section of, or attachment to, said frame.

20 Claims, 7 Drawing Sheets

(56) References Cited

U.S. PATENT DOCUMENTS

| | | | |
|---|---|---|---|
| 3,945,463 A | 3/1976 | Okano et al. | |
| 4,461,489 A | 7/1984 | Tsukiji et al. | |
| 4,712,629 A * | 12/1987 | Takahashi et al. | 180/68.1 |
| 4,721,178 A | 1/1988 | Ito | |
| 4,726,439 A | 2/1988 | Iwao et al. | |
| 4,887,488 A * | 12/1989 | Miyazaki | 180/227 |
| 4,951,774 A | 8/1990 | Buell | |
| 5,054,571 A | 10/1991 | Takasaka | |
| 5,145,023 A | 9/1992 | Tsurumi et al. | |
| 5,193,634 A | 3/1993 | Masut | |
| 5,501,292 A | 3/1996 | Kawashima et al. | |
| 5,524,725 A * | 6/1996 | Schantzen | 180/190 |
| 5,657,830 A | 8/1997 | Kawashima et al. | |
| 5,670,830 A | 9/1997 | Koga et al. | |
| 5,722,502 A | 3/1998 | Kubo | |
| 5,975,230 A | 11/1999 | Bourget | |
| 6,037,726 A | 3/2000 | Tabata et al. | |
| 6,186,550 B1 | 2/2001 | Horii et al. | |
| 6,326,765 B1 | 12/2001 | Hughes et al. | |
| 6,422,332 B1 | 7/2002 | Takata | |
| 6,483,198 B2 | 11/2002 | Schmitz et al. | |
| 6,484,837 B1 | 11/2002 | Buell et al. | |
| 6,516,910 B2 | 2/2003 | Buell et al. | |
| 6,555,928 B1 | 4/2003 | Mizuno et al. | |
| 6,609,585 B2 | 8/2003 | Buell et al. | |
| 6,722,460 B2 | 4/2004 | Yang et al. | |
| 6,752,229 B2 | 6/2004 | Ho | |
| 6,773,077 B2 | 8/2004 | Buell et al. | |
| 6,845,836 B2 * | 1/2005 | Inaoka et al. | 180/228 |
| 6,913,100 B2 | 7/2005 | Chen | |
| 7,392,870 B2 | 7/2008 | Kojima et al. | |
| 7,407,462 B2 | 8/2008 | Tsukada | |
| 7,431,112 B2 | 10/2008 | Masuda et al. | |
| 7,463,958 B2 | 12/2008 | Suzuki | |
| 7,469,760 B2 | 12/2008 | Kamen et al. | |
| 7,475,746 B2 | 1/2009 | Tsukada et al. | |
| 7,530,417 B2 | 5/2009 | Domergue | |
| 7,665,557 B2 | 2/2010 | Hughes et al. | |
| 7,819,211 B2 | 10/2010 | Fukami et al. | |
| 7,963,358 B2 | 6/2011 | Buell et al. | |
| 8,007,005 B2 | 8/2011 | Yamashita | |
| 8,011,274 B2 | 9/2011 | Abramov | |
| 8,312,954 B2 | 11/2012 | Johnson et al. | |
| 8,348,005 B2 | 1/2013 | Hanawa et al. | |
| 8,424,626 B2 | 4/2013 | Nomura et al. | |
| 8,499,867 B2 | 8/2013 | Marcacci et al. | |
| 8,540,046 B2 | 9/2013 | Ishikawa et al. | |
| 8,556,021 B2 | 10/2013 | Nomura et al. | |
| 8,627,916 B2 | 1/2014 | Shinde et al. | |
| 2002/0033296 A1 * | 3/2002 | Ohyama et al. | 180/312 |
| 2003/0230440 A1 | 12/2003 | Kamen et al. | |
| 2004/0016582 A1 | 1/2004 | Ho | |
| 2004/0108154 A1 | 6/2004 | Chen | |
| 2005/0211481 A1 | 9/2005 | Sasamoto | |
| 2006/0027192 A1 | 2/2006 | Tsukada et al. | |
| 2006/0032689 A1 | 2/2006 | Kojima et al. | |
| 2006/0032690 A1 | 2/2006 | Inomoto et al. | |
| 2006/0219447 A1 | 10/2006 | Saitou et al. | |
| 2006/0289214 A1 | 12/2006 | Katsuhiro et al. | |
| 2007/0000703 A1 | 1/2007 | Hughes et al. | |
| 2007/0235235 A1 | 10/2007 | Fukami et al. | |
| 2007/0256873 A1 | 11/2007 | Masuda et al. | |
| 2008/0012445 A1 | 1/2008 | Abe | |
| 2008/0127915 A1 | 6/2008 | Bilek | |
| 2008/0185196 A1 | 8/2008 | Artioli | |
| 2009/0023056 A1 | 1/2009 | Adams et al. | |
| 2009/0139781 A1 | 6/2009 | Straubel | |
| 2009/0312147 A1 | 12/2009 | Oshima et al. | |
| 2010/0193275 A1 | 8/2010 | Song et al. | |
| 2010/0243349 A1 | 9/2010 | Nomura | |
| 2010/0294582 A1 | 11/2010 | Eguchi | |
| 2011/0168467 A1 | 7/2011 | Kamen et al. | |
| 2011/0259660 A1 | 10/2011 | Johnson et al. | |
| 2011/0263379 A1 | 10/2011 | Liang et al. | |
| 2012/0080249 A1 | 4/2012 | Yates et al. | |
| 2012/0208672 A1 | 8/2012 | Sujan et al. | |
| 2012/0217075 A1 | 8/2012 | Nomura et al. | |
| 2012/0241241 A1 | 9/2012 | Takamura et al. | |
| 2012/0247122 A1 | 10/2012 | Brooks et al. | |
| 2013/0069426 A1 | 3/2013 | Nien et al. | |
| 2013/0075178 A1 | 3/2013 | Petersson | |
| 2013/0081895 A1 | 4/2013 | Nomura et al. | |
| 2013/0168170 A1 | 7/2013 | Buell et al. | |
| 2013/0168171 A1 | 7/2013 | Buell et al. | |
| 2013/0184913 A1 | 7/2013 | Sujan et al. | |

FOREIGN PATENT DOCUMENTS

| | | |
|---|---|---|
| EP | 1738947 | 1/2007 |
| EP | 2113454 | 11/2009 |
| EP | 2236338 | 10/2010 |
| EP | 2253530 | 11/2010 |
| EP | 2301790 | 3/2011 |
| JP | 3246183 | 11/1991 |
| JP | 07-117774 | 5/1995 |
| JP | 2010-228627 | 10/2010 |
| WO | 2011127389 | 10/2011 |

OTHER PUBLICATIONS

Abstract of Japanese Patent No. 2010-228627 (English Machine Translation).

"Kamasura", http://www.mopedarmy.com/wiki/Kamasura, printed Dec. 29, 2011.

* cited by examiner

LIGHTWEIGHT INTEGRATED REAR SUSPENSION AND DRIVE ENCLOSURE FOR A RIDDEN MOTORIZED VEHICLE

RELATED APPLICATIONS

The present application claims priority to and the benefit of U.S. Provisional Patent Application No. 61/582,814, filed on Jan. 3, 2012, which is incorporated herein by reference.

BACKGROUND AND SUMMARY

Presently disclosed is a rear suspension and drive enclosure for a ridden motorized vehicle. The presently disclosed rear suspension and drive enclosure may be used with any ridden motorized vehicle having a driven axle pivotally attached to the frame of the motorized vehicle, the driven axle operably connected to a motor power source. Such ridden motorized vehicles may include motor scooters, motorcycles, all-terrain-vehicles, tricycles, snowmobiles, and lawn tractors.

Ridden motorized vehicles, such as those disclosed herein, generally comprise a frame, a power system, and at least one drive wheel. The at least one wheel may provide traction with the ground directly, or may be part of a track system such as with a snowmobile. The power from the power system must be transferred to one of the wheels, usually the rear wheel, to propel to the vehicle. The power from the power system is usually transferred to the rear wheel through a swingarm, or drive enclosure, disposed between the frame of the motorized vehicle and the rear wheel. A swingarm is used to firmly hold the axle, of the driven wheel, a fixed distance laterally from the frame while allowing the rear axle to pivot upwardly and downwardly to allow the suspension to absorb bumps and vibrations from the ground. Also the drive linkage assembly, whether a drive shaft, chain, or belt is disposed along the swingarm, providing power to the rear wheel.

Use of an enclosed drive chain or belt between the motor assembly and the rear wheel is known for use with ridden vehicles such as motorized scooters, motorcycles, all-terrain-vehicles, and snowmobiles. In most cases this includes a fixed multi-piece chain and rear sprocket housing that is mounted to the rear suspension, an enclosure for the motor sprocket which is affixed to the motor, and flexible enclosure sections which connect the upper and lower sections of the two fixed enclosures. This type of system is costly, heavy, and complex to manufacture and maintain. In scooters it is also common to have a drive system wherein the motor is attached to the rear suspension and drives the rear wheel via a gear drive, a drive shaft, or a mixture of gears and chains. Such designs described, for example, by Japanese Patent Application Publication JP 2010-228627 are complex, and the motion of the motor with the suspension increases unsprung weight to the detriment of ride quality.

Unsprung weight is the mass of every component on a ridden vehicle not supported by the suspension. Such components may include the wheels, brake systems, axel, and suspension system. In systems such as those described by JP 2010-228627 this also includes the motor and the gear system. A ridden vehicle having a lighter unsprung weight will have unsprung components moving more readily with the road bumps and irregularities, maintaining the traction between the road and the wheel, and therefore, provide a more uniform grip and improved performance. A ridden vehicle having a heavier unsprung weight will have unsprung components which will absorb less of the bumps and irregularities in the road and, therefore, vibrations will be transmitted to the rest of the vehicle, the rider, and passengers. For the same reason road noise will increase with vehicles having a heavier unsprung weight as well. Therefore, there is presently a need for a ridden motorized vehicle, such as a motor scooter, motorcycle, ATV, tricycle, snowmobile, or lawn tractor, having a lightweight rear suspension and drive enclosure system.

Further, systems of the prior art include motor scooters and motorcycles having a swingarm type rear suspension system, pivoting on an axis shaft mounted to the frame behind the engine, such that the output shaft of the engine is not aligned with the pivot point of the drive enclosure or swingarm, and include a chain drive enclosure in the swingarm. These systems require at least two chains and a double intermediary sprocket on the swingarm pivot axis, providing a system which is complex and difficult to manufacture and service. The distance between the swingarm pivot point and the rear wheel axle remains constant during operation of the motor vehicle. A ridden vehicle having a swingarm or drive enclosure pivot point not aligned with the output shaft of the motor assembly is a vehicle having a rear wheel axle having a variable distance from the output shaft of the motor assembly while the rear wheel pivots upwardly and downwardly about the swingarm pivot point. A variable distance between the rear wheel axle and the motor assembly output shaft prevents a drive chain or belt having a fixed length to directly connect the rear wheel axle with the motor assembly output shaft. Some prior art systems have a sprocket on the output shaft of the motor assembly and a final sprocket mounted on the rear wheel concentric with the axle which allows for loosening and tightening of the chain during suspension movement, caused by the variation in distance between the engine and wheel sprockets as the suspension moves, and, in turn, causing noise, wear, and imprecise drive delivery. To overcome this problem other prior art systems have a double intermediary sprocket at the swingarm pivot point, and two chains or drive belts, one between the sprocket on the output shaft of the motor assembly and the double intermediary sprocket at the swingarm pivot point, and a second between the double intermediary sprocket at the swingarm pivot point and a sprocket on the rear wheel axle. Such prior art systems have many components comprised within the drive train of the motorized vehicles and are, therefore, complex to manufacture, install, and maintain.

There is presently a need for a drive system in ridden vehicles which provides both rear suspension with an enclosed drive transfer system, such as a drive shaft, belt, or chain, while reducing the unsprung weight of the system. Also, there is presently a need for a lightweight rear suspension and drive enclosure system for a ridden motorized vehicle which has fewer parts, to reduce the cost and complexity of manufacturing, installation and maintenance of such systems. Presently disclosed is a simple two piece enclosure wherein the drive transfer system is totally enclosed, has integrated chain tensioner, has one drive transfer system, such as a drive shaft, chain, or belt between a motor assembly output shaft and rear wheel axle, has lower unsprung weight, and provides easy service access to the drive transfer system.

Presently disclosed is a ridden motorized vehicle having a drive enclosure disposed between the frame and the rear wheel. The ridden vehicle having a frame, a motor assembly attached to the frame, and the motor assembly having an output shaft. Such a motor assembly may comprise any type of motor, for example, an electric motor or an internal combustion engine. The output shaft of the motor assembly may be adapted to directly or indirectly transfer the power from the drive assembly to a desired location at least one drive wheel. In some embodiments, the motor assembly may comprise a motor, as previously discussed, and together with a gear system or gear box operably connected to the motor, the gear system adapted to change the speed of the output shaft from the motor assembly. The motor and gear system may be arranged as desired. In some embodiments, the gear system may be aligned with the output shaft of the motor, such that the motor and gear system, included as part of the motor assembly, are positioned side-by-side widthwise in the vehicle. In other embodiments, the motor and gear system included as part of the motor assembly may be positioned lengthwise in the vehicle, such that the gear system is next to, either behind or in front of, the motor, and operably connected to the motor, the gear system having an output shaft, being the output shaft of the motor assembly.

The drive enclosure of the ridden vehicle has a first end and a second end. The drive enclosure adapted to allow the rear wheel to pivot upwardly and downwardly relative to the main chassis frame, with the first end pivotally attached to the frame, the attachment point aligned with the output shaft of the motor assembly, and the second end having a rear wheel attached. The ridden vehicle may have a sprocket attached to the output shaft of the motor assembly at the first end of the drive enclosure and a sprocket attached to the rear wheel axle at the second end of the drive enclosure, with a chain or belt disposed around and between the two sprockets providing drive from the motor assembly to the rear wheel. The ridden vehicle may have a shock absorber disposed between the drive enclosure and the main chassis frame providing shock resistance for the ridden vehicle, about the first end pivoting on the frame, while being ridden over uneven terrain.

In some embodiments, the drive enclosure may comprise an inner drive enclosure section and an outer drive enclosure section fixed to the inner drive enclosure section by fasteners to provide a monocoque structural drive enclosure capable of withstanding the torsional forces exerted by the weight and motion of the vehicle as it is ridden. The inner drive enclosure section being inward along the longitudinal axis of the motor vehicle, i.e. adjacent the rear wheel, the outer drive enclosure attached to the inner drive enclosure being outward along the longitudinal axis of the ridden motor vehicle relative to the inner drive enclosure, i.e. on the side of the inner drive enclosure opposite the rear wheel. Such a configuration forms a monocoque structure. The monocoque structure of embodiments of the drive enclosure provides a drive enclosure adapted to support the structural loads and torsions exerted by the ridden vehicle during operation, by using the drive enclosure's external skin, as opposed to an internal frame or truss.

Such a monocoque structural drive enclosure provides a drive enclosure with fewer parts compared to prior art drive enclosures. The presently disclosed monocoque structural drive enclosure provides for reduced cost of manufacture, installation and maintenance, as well as reduced complexity of manufacture, installation and maintenance. The presently disclosed monocoque structural drive enclosure also provides for reduced unsprung weight of the ridden vehicle, thereby improving ride quality and reducing road noise. Also, the presently disclosed ridden vehicle, having a drive enclosure with a pivot point aligned with the motor assembly output shaft, provides a vehicle providing a single drive chain or belt between the sprocket on the motor assembly output shaft and the sprocket on the rear wheel axle while maintaining the distance between the motor assembly output shaft and the rear wheel axle, as opposed to a dual drive chain or belt system of the prior art. Therefore, a ridden vehicle of the presently disclosed design provides for reduced complexity of manufacture, installation and maintenance, as well as reduced cost for all three phases.

In some embodiments, the ridden vehicle may be a motor scooter having a motor assembly disposed on the main chassis frame, while also providing a flat board, step-through construction. This embodiment provides a motor scooter with reduced unsprung weight while also providing the step-through convenience of traditional motor scooters, which traditionally have their motor assembly disposed on the rear wheel axle. This easily maintains the attraction of the motor scooter to both men and women alike, while greatly reducing unsprung weight with the motor assembly attached to the frame of the motor scooter instead of the rear wheel axle. The greatly reduced unsprung weight provides a motor scooter with an improved ride quality and reduced road noise. In some embodiments, the ridden vehicle may be an electric scooter or a hybrid scooter.

In some embodiments, the monocoque structural drive enclosure is disposed on one side of the motorized vehicle, such as a motor scooter, motorcycle, ATV, tricycle, snowmobile, or lawn tractor, providing for easy access and maintenance to the rear wheel, allowing the rear wheel to be removed without disassembling the drive enclosure. In other embodiments, the presently disclosed monocoque structural drive enclosure may be assembled on both sides of the vehicle, having a dual drive chain or belt, providing for increased power to be transmitted between the motor assembly and the rear wheel. Furthermore, the motor assembly, as discussed above, may have an integrated or attached gear system disposed between the motor shaft and the output sprocket at the first end of the drive enclosure, the output shaft for the gear system aligned with the pivot point of the drive enclosure at the first end of the drive enclosure.

Also disclosed is a ridden vehicle comprising a frame, at least one motor assembly attached to the frame, and a motor assembly having an output shaft. The motor assembly may be attached to a motor assembly mount portion, removable from the frame. Such a configuration provides for a more simple installation and manufacturing system for assembling the ridden vehicle. The ridden vehicle may also have a drive enclosure having a first end and a second end, the first end having a frame connection point aligned with the output shaft of the motor assembly, and the second end having a wheel connection point, the drive enclosure adapted to pivot about the frame connection point. The ridden vehicle further comprises a wheel connected to the wheel connection point at the second end of the drive enclosure and a linkage apparatus disposed between the output shaft of the motor assembly and the wheel connected at the second end of the drive enclosure, the linkage apparatus adapted to transfer power from the output shaft of the motor assembly to the drive wheel. The linkage apparatus between the output shaft of the motor and the wheel may be a drive shaft, a chain, or a belt.

The drive enclosure of the presently disclosed ridden vehicle may comprise a first part and a second part, the first part positioned inwardly of the vehicle, adjacent the rear wheel, the second part positioned outwardly and fastened to the first part. Such embodiments of the drive enclosure may provide a monocoque drive enclosure.

The motor assembly comprises a motor, or alternatively a motor and at least one gear. The motor may be an internal combustion engine or an electric motor or a combination thereof. The drive enclosure may further comprise a tensioner mounted in the drive enclosure and adapted to exert a tension force to the linkage apparatus. A shock absorber and/or spring, may be disposed between the drive enclosure and the frame, to provide shock absorption when the ridden vehicle is in operation.

The presently disclosed ridden vehicle may further comprise at least one first sprocket attached to the output shaft of the motor assembly, and at least one second sprocket attached to the rear wheel axle, the linkage apparatus disposed between the first sprocket and the second sprocket.

In some embodiments, the ridden vehicle may comprise the drive enclosure disposed between the frame and the rear wheel on a single side of a vehicle. In other embodiments, the ridden vehicle may further comprise at least two drive enclosures, each drive enclosure disposed on opposing sides of the vehicle, each drive enclosure having a first end and a second end, the first end of each drive enclosure having a frame connection point aligned with the output shaft of the motor assembly, and the second end of each drive enclosure having a wheel connection point, the at least two drive enclosures adapted to pivot about the frame connection point. In embodiments of the ridden vehicle having at least two drive enclosures, the frame connection point of each drive enclosure may be adapted to attach to the frame. Where each drive enclosure is attached to the frame on opposite sides of the frame, or alternatively, each drive enclosure is attached to the frame on the same side.

Also disclosed is a drive enclosure for a ridden vehicle, comprising an inner drive enclosure disposed between a vehicle frame and a rear wheel of a vehicle, the inner drive enclosure having a first end and a second end, the first end having a frame connection point, and the second end having a wheel connection point, the inner drive enclosure adapted to pivot about the frame connection point aligned with the output shaft of a vehicle motor assembly; and an outer drive enclosure fastened to the inner drive enclosure. In some embodiments the outer drive enclosure comprises a first end and a second end, the first end having a frame connection point, and the second end having a wheel connection point, the inner drive enclosure adapted to pivot about the frame connection point aligned with a ridden vehicle motor assembly output shaft. Additionally, or in the alternative, the inner drive enclosure and outer drive enclosure form a monocoque drive enclosure.

The scope and content of the presently disclosed ridden vehicle, as discussed above, may also be augmented by the following description of the drawings. The drawings depict a two-wheeled motor scooter but the invention herein described is applicable to all forms of ridden motorized vehicles including, but not limited to, motor cycles, motor scooters, all-terrain vehicle, snow mobiles, tricycles, or lawn tractors.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
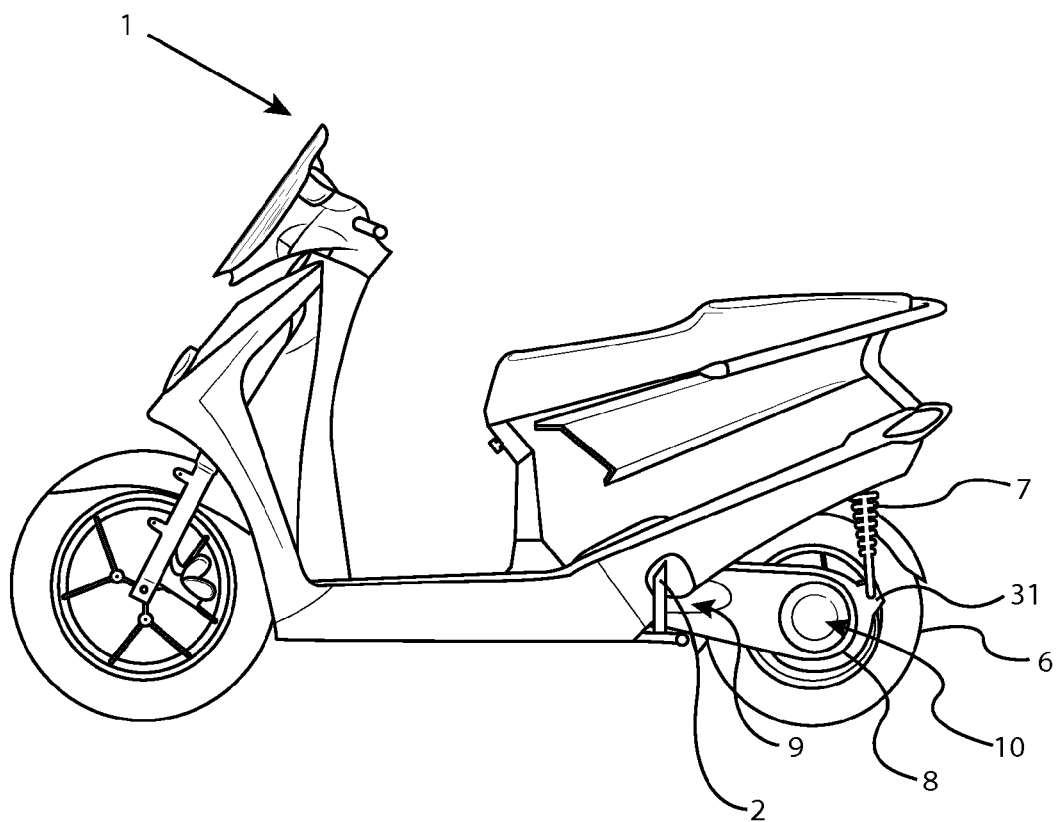
FIG. 1 is a side-view of a motor scooter having the presently disclosed drive enclosure.
Figure 2:
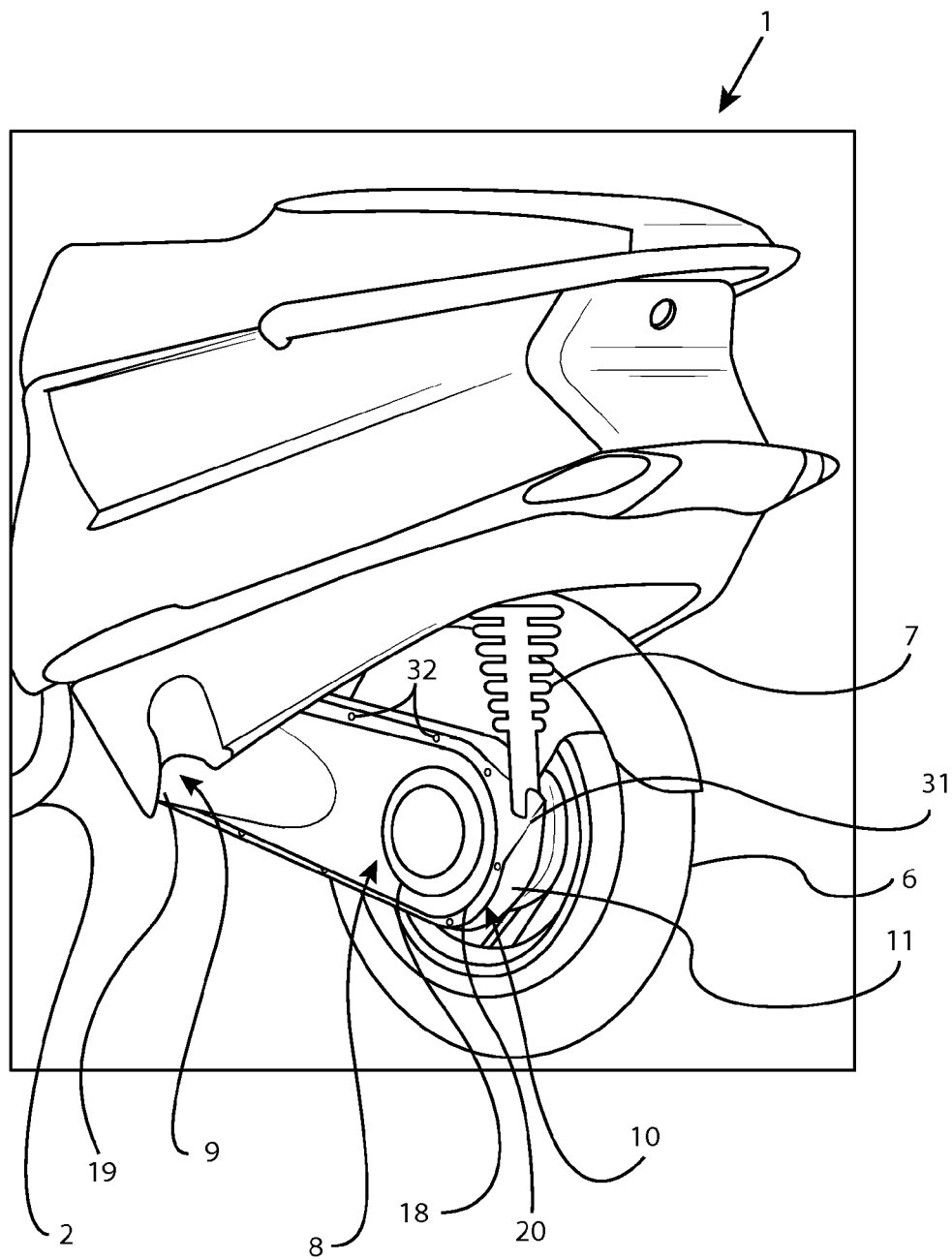
FIG. 2 is a side-rear perspective view of a motor scooter having the presently disclosed drive enclosure.

Referring to FIGS. 1 and 2, disclosed is a ridden motorized vehicle 1 having a monocoque drive enclosure 8. The monocoque drive enclosure having a first end 9 and a second end 10 extending from the main chassis frame 2 of the motorized vehicle 1 to the rear wheel 6 of the motorized vehicle 1. A rear shock absorber 7 may be attached to a shock absorber mount 31 at the second end 10 of the monocoque drive enclosure 8, with the opposite end of the shock absorber mounted to the main chassis frame 2. The shock absorber mount 31 may be integrated into the monocoque drive enclosure 8 or may be separate and attached to the monocoque drive enclosure 8. The shock absorber 7 may be attached to the second end 10 of the drive enclosure 8, as shown in the Figures. Alternatively, the shock absorber 7 may be attached to the drive enclosure 8 at the first end 9 or at some other position along the drive enclosure 8.

In some embodiments, the shock absorber 7 may be attached to the rear wheel axle 26. In any case, the rear shock absorber 7 may be combined with a rear spring to form a suspension system, such a spring may be a separate component or may be integrated with the shock absorber 7. The first end 9 of the monocoque drive enclosure 8 may be pivotally attached to the main chassis frame 2 of the ridden motorized vehicle 1. The rear wheel 6 of the ridden motorized vehicle 1 may be attached to the second end 10 of the monocoque drive enclosure 8, and the monocoque drive enclosure 8 adapted to allow the rear wheel 6 to pivot upwardly and downwardly in relation to the main chassis frame 2. The shock absorber 7 adapted to absorb upward and downward forces caused by irregularities in ground surface while the motorized vehicle 1 is being ridden.

Figure 3:
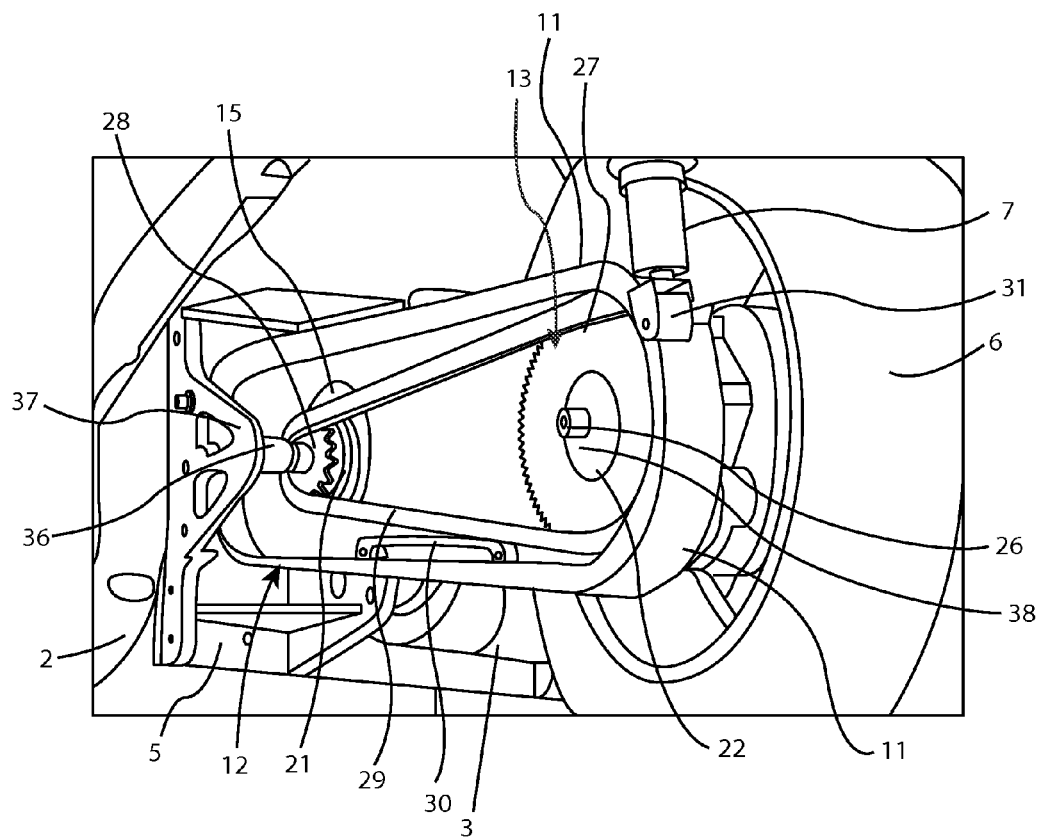
FIG. 3 is a schematic view of the rear end of a two-wheeled vehicle having a monocoque drive enclosure.

FIG. 3 is a perspective schematic view of the rear end of a two wheeled ridden vehicle 1 having a monocoque drive enclosure 8. The two-wheeled vehicle 1 has a main chassis frame 2, a motor assembly 3 mounted rigidly to said frame 2, a rear wheel 6, and rear shock absorber 7. The motor assembly 3 has an output shaft 4 adapted to transmit the power from the motor assembly. The motor assembly 3 may comprise any form of motor, for example, an electric motor, or an internal combustion engine. Further, the motor assembly 3 may form part of the structure of the frame 2. In some embodiments, the motor assembly 3 may comprise a motor, as previously described, and a gear system or gear box. The gear system or gear box adapted to change the speed of the output shaft 4 of the motor assembly 3. In some embodiments, the gear system or gear box may be disposed to be aligned with the output shaft of the motor, the motor and the gear system, included as part of the motor assembly 3, positioned side-by-side, widthwise in the motorized vehicle, the motor assembly 3 having an output shaft 4 aligned with the pivot point of the drive enclosure 8. In alternative embodiments, the motor and the gear system may be positioned lengthwise in the ridden motorized vehicle, the gear system in front or behind the motor, the motor and gear system included as part of the motor assembly 3 having an output shaft 4 aligned with the pivot point of the drive enclosure 8.

Figure 4:
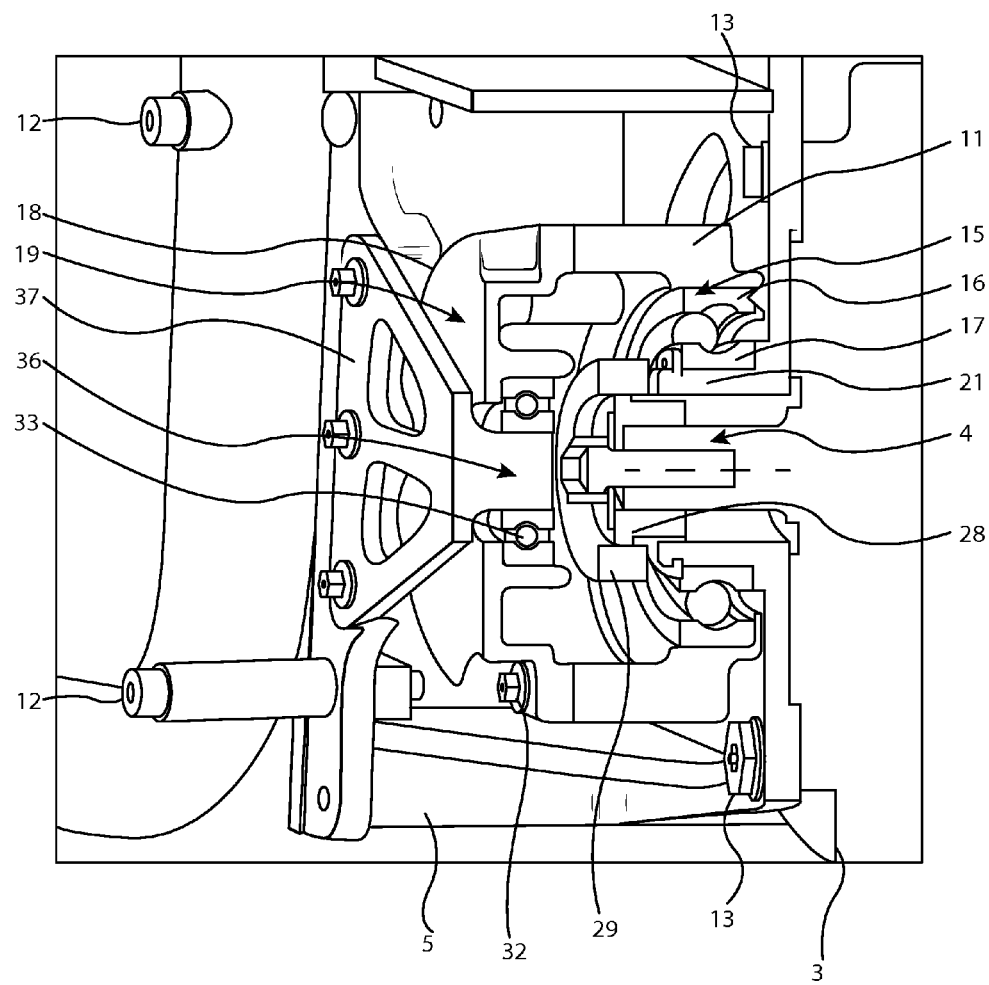
FIG. 4 is a schematic view of the frame end of the presently disclosed drive enclosure.

The structural monocoque drive enclosure 8 comprises a structural inner drive enclosure 11 and a structural outer drive enclosure 18. The structural inner drive enclosure 11 has a first end 9 and a second end 10. FIG. 4 is a schematic view of the first end 9 of the monocoque drive enclosure 8 attached to a two-wheel ridden vehicle 1. Now referring to FIGS. 3 and 4, the first end 9 of the structural inner drive enclosure 11 is pivoted on a front inner pivot bearing 15 which has its outer race 16 pressed into the inner drive enclosure 11, and has its inner race 17 riding on a boss 21 externally concentric to the motor assembly output shaft 4. The boss 21 may be part of an engine or motor assembly housing or integral to a mount section 5 of the frame 2 to which the motor assembly 3 is attached. In some embodiments, as shown, the drive enclosure 8 may be disposed between the frame 2 and the rear wheel 6 on a single side of a ridden vehicle, such as a motor scooter, electric scooter or hybrid scooter, and adapted to secure the rear wheel 6 to the vehicle 2 and to house the front and rear sprockets 28, 27 and the drive chain or belt 29, or linkage apparatus.

Figure 5:
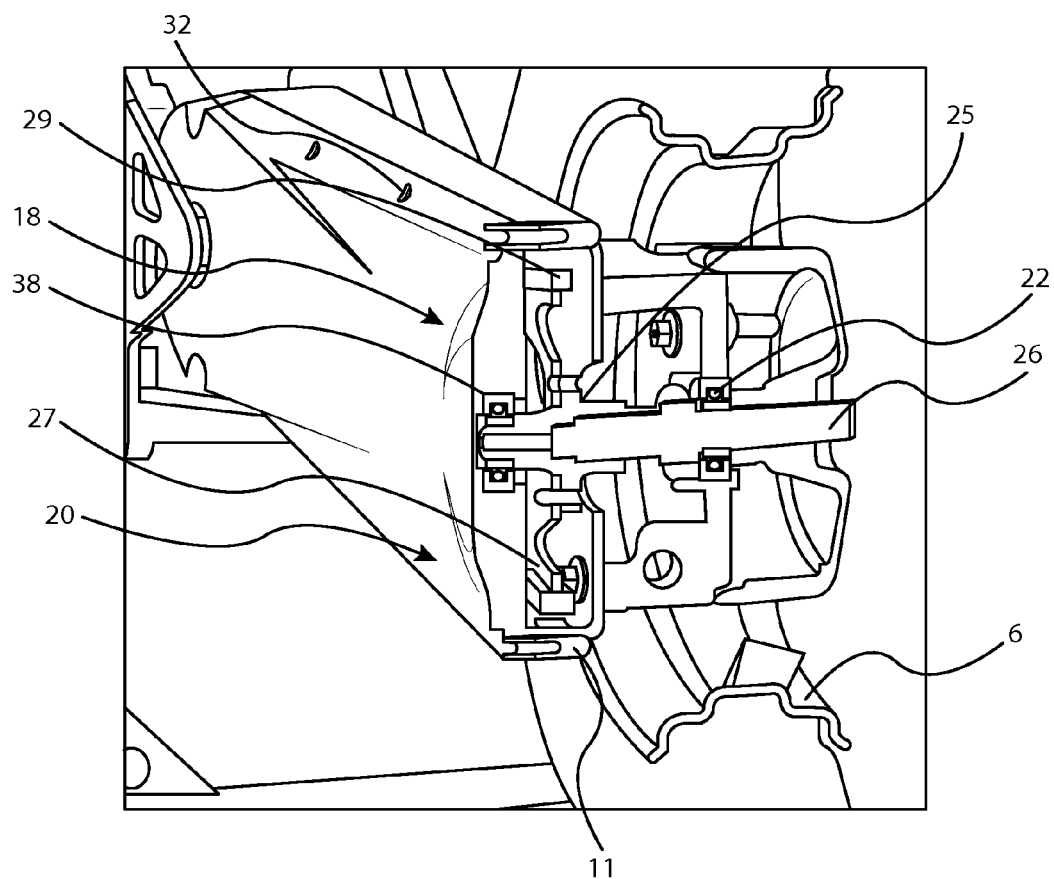
FIG. 5 is a schematic view of the wheel end of the presently disclosed drive enclosure.
Figure 6:
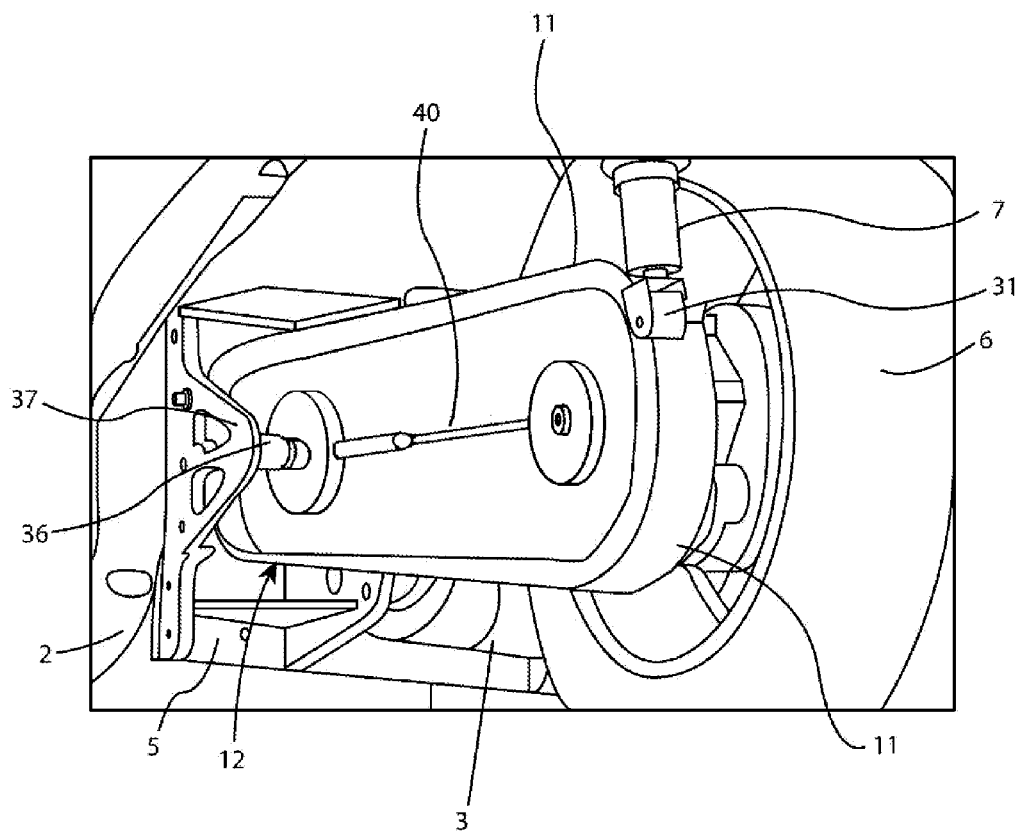
FIG. 6 is a schematic view of the rear end of a two-wheeled vehicle having a draft shaft within a drive enclosure.

FIG. 5 is a perspective view of the second end 10 of the structural drive enclosure 8. Referring now to FIGS. 3 and 5, the inner drive enclosure 11 also has a bearing 22 mounted in an integrated outer race housing boss 25 at the second end 10 of the structural inner drive enclosure 11, and an axle shaft 26 to which rear wheel 6 is fastened. Rear wheel 6 rotates in the inner race 24 of the bearing 22. The rear sprocket 27 is mounted to the rear wheel axle 26 on the opposite side of the inner enclosure 11 from the wheel 6. The front sprocket 28 is mounted to the motor assembly output shaft 4. The front sprocket 28 and the rear sprocket 27 are connected by a drive chain or belt 29. An automatic or manual drive tension adjuster 30 may be mounted to the lower part of inner drive enclosure 11. Rear shock absorber 7 may be attached to a mount 31 on inner enclosure 11. In other embodiments, such as illustrated in FIG. 6, the motor assembly output shaft 4 may be connected to the rear axle 26 by a drive shaft 40 disposed within the monocoque drive enclosure 8. Such a system may or may not comprise sprockets at the output shaft 4 of the motor assembly 3 and the rear wheel axle 26.

The inner drive chain enclosure 11 may provide the structural support necessary to hold the rear wheel 6, rear sprocket 27 and other elements in lateral relation with the main chassis frame 2, and the structural support necessary for the shock absorber 7, while allowing upward and downward pivoting of the rear wheel 6 relative to the main chassis frame 2.

An outer enclosure 18 may be fixed to the structural inner drive enclosure 11 with fasteners 32 which attach the outer enclosure 18 and the inner enclosure 11 together. The attached outer enclosure 18 and inner enclosure 11 may be adapted to prevent ingress of water and other substances into the drive enclosure 8 and thereby reducing corrosion and wear on the drive chain or belt 29 and the sprockets 27 and 28. The sealed drive enclosure 8 may also house a lubricant and preservative, such as an oil, to improve the longevity of the drive chain or belt 29 and sprockets 27 and 28. The fasteners 32 adapted to attach the outer enclosure 18 to the inner enclosure 11 may be any type of fastener, for example bolts, screws, or clips, adapted to seal the outer enclosure 18 onto the inner enclosure 11. The outer drive enclosure 18 may also provide structural support to the structural drive enclosure 8 similarly to the inner enclosure 11 and may be fixed to the inner enclosure 11 to form a monocoque structural assembly 8 adapted to carry drive, torsional and lateral rear wheel loads between the rear wheel 6 and the main frame 2 with reduced deflection. The outer enclosure 18 has a first end 19 and a second end 20. The first end 19 of the outer enclosure 18 mounts to the outer race 34 of a pivot bearing 33 in an integrated housing 35. An outer pivot axle 36 is provided to be positioned into the pivot bearing 33. The outer pivot axle 36 is attached to, or integral with, an axle plate 37, and is aligned with the motor assembly output shaft 4. The axle plate 37 may be attached to main frame 2. The second end 20 of the outer enclosure 18 comprises a wheel axle bearing 38 which captures the rear wheel axle 26, the wheel axle bearing 38 aligned with bearing 22 of the inner enclosure 11, when the outer enclosure 18 is mounted to the inner enclosure 11. The outer enclosure 18 having a bearing 33 in the first end 19 and a bearing 38 in the second end 20 engaging with the frame pivot axle 36 and the rear wheel axle 26 permits the outer enclosure 18 to provide structural support to the monocoque structural drive enclosure 8.

The axle plate 37 may be adapted to secure the first end 9 of the drive enclosure 8 to the frame 2. In some embodiments, as shown, the axle plate 37 may be attached to the motor assembly mount section 5 which, in turn, is attached to the frame 2 of the ridden motorized vehicle 1. Such configurations allow easy removal of the power section of the vehicle 2, including the motor assembly 3, the drive enclosure 8 and the rear wheel 6. In some embodiments, the motor assembly may be attached to the motor assembly mount section 5, which is removable from the frame with mounting pins 12 and fasteners 13, as shown in FIG. 4.

In some embodiments, the inner enclosure 11 and the outer enclosure 18 may be formed of the same material, such as metal, high density plastic, or carbon fiber. Such metals may include titanium alloy, magnesium alloy, aluminum alloy, steel alloy, iron alloy and combinations or composites thereof. The inner enclosure 11 and outer enclosure 18 may be pressed from sheet material, forged or cast to form a monocoque structural member capable of providing support for the torsional stresses exerted by the rear wheel 6 and shock absorber 7 during operation of the vehicle 1.

In other embodiments, the inner enclosure 11 may provide all of the structural support necessary for the drive enclosure 8 to perform its function. The outer drive enclosure 18 may be a non-structural cover, without having bearings at the first end 19 aligned with the output shaft 4 of the motor assembly 3, and at the second end 20 aligned with the rear wheel axle shaft 26. The non-structural outer drive enclosure 18 may be formed of a different material than the inner drive enclosure 11 or may be formed of the same material.

In some embodiments of the ridden vehicle 1, a gear system or transmission may be disposed between the motor assembly 3 and the first end 9 of the drive enclosure 8. The gear system may be in-line with the output shaft 4 of the motor assembly 3, with the pivot point of the first end 9 of the drive enclosure 8 aligned with the output shaft of the gear system or transmission. In some embodiments of the vehicle 1, the motor assembly 3 may further comprise a gear system or transmission disposed between the motor and the sprocket 28 at the first end 9 of the drive enclosure 8 with the gear system or transmission adjacent the motor within the motor assembly 3, with a drive connection between the motor and the transmission. The output shaft of the motor assembly 3 may also be the output shaft of the gear system or transmission and connected to the sprocket 28 at the first end 9 of the drive enclosure 8. The pivot point of the drive enclosure 8 at the first end 9 of the drive enclosure 8 may be aligned with the output shaft of the gear system or transmission. In some embodiments, the ridden vehicle 1 may comprise a transmission or gear system disposed in the monocoque structural drive enclosure 8. Such a gear system or transmission may be disposed at the hub of the rear wheel 6 on the rear wheel axle 26. Alternatively, the gear system or transmission may be disposed at another location along the drive enclosure 8.

Figure 7:
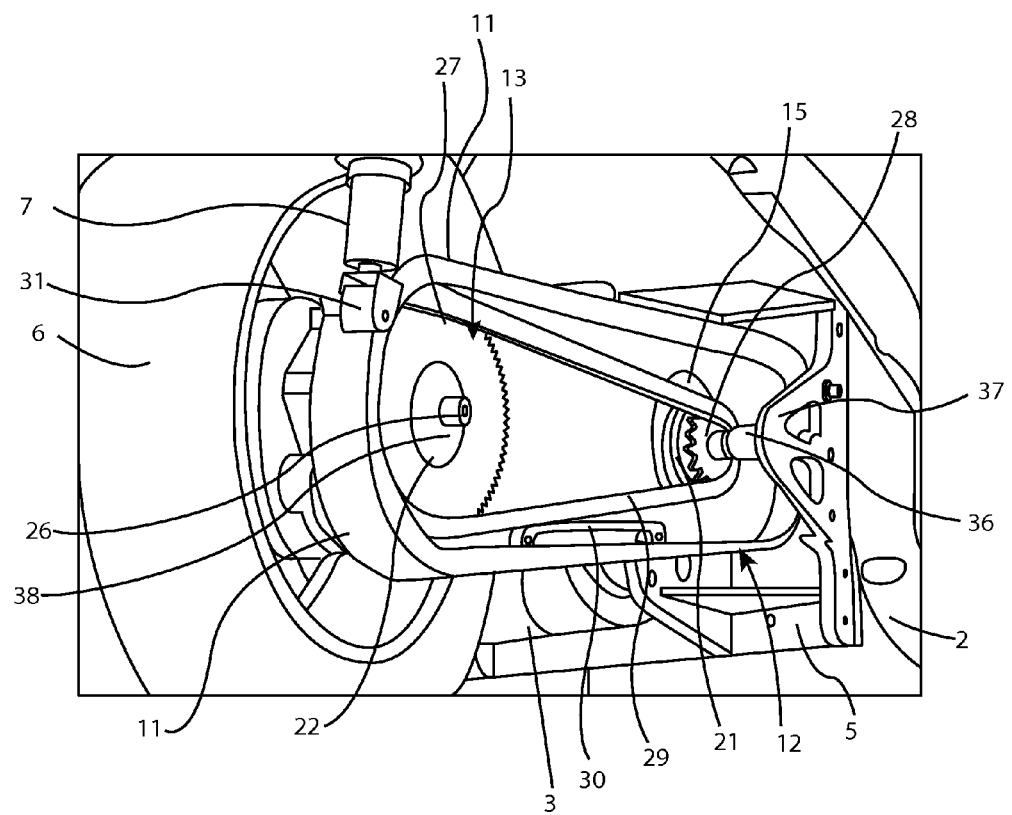
FIG. 7 is a schematic view of the rear end of a two-wheeled vehicle having a second drive enclosure.

The ridden vehicle 1 may comprise of a single drive enclosure 8 as shown in the Figures, disposed on one side of the vehicle 1 providing for access for maintenance to the rear wheel 6 of the vehicle 1 without dismantling the drive enclosure 8. Alternatively, the ridden vehicle 1 may comprise two inner drive enclosures 11, and two outer drive enclosures 18, disposed on opposite sides of the vehicle 1 as illustrated in FIG. 3 (showing the left side) and FIG. 7 (showing the second drive enclosure on the right side). The two drive inner enclosures 11 and outer drive enclosures 18 disposed on opposite sides of the vehicle 1 may be substantially similar in construction, housing sprockets at the first end at motor assembly output shafts 4 and at the rear wheel axle 26 and a drive chain or belt 29 disposed around and between the sprockets. Alternatively, one of the inner drive enclosures 11 may house the sprockets at the first end 9 at the motor assembly output shaft 4 and at the rear wheel axle 26, the second of the inner drive enclosures 11 providing structural support for the rear wheel 6 and shock absorber 7 and/or suspension system, and disposed between the main chassis frame 2 and the rear wheel axle 26. In each case, the pivot point for the inner drive enclosures 11 and outer drive enclosures 18 on both sides of the ridden vehicle 1 are aligned with the motor assembly output shaft 4, or a gear system or transmission output shaft, thereby providing a vehicle 1 having a single drive chain or belt 29, reducing the complexity of manufacture and maintenance of the ridden vehicle 1.

The drive enclosure 8 may comprise a monocoque structure having an inner enclosure 11 and an outer enclosure 18, comprising at least one motor assembly sprocket 28 and at least one wheel sprocket 27, a drive belt or chain 29 disposed around and between the at least one motor assembly sprocket 28 and the at least one wheel sprocket 27. Such a drive enclosure 8 may be adapted to be attached and removed from the ridden vehicle 1 as a single combined component, adapted to attach to the motor assembly output shaft 4 and the frame 2 at the first end 9 of the structural drive enclosure and attach to the rear wheel axle 26 at the second end 10 of the structural drive enclosure 8.

The shock absorber or suspension system 7 may be disposed between a position along the length of structural drive enclosure 8 and the main chassis frame 2 of the vehicle 1. The combined component drive enclosure 8 adapted to provide the structural support for the torsional forces exerted on the drive enclosure 8 from the rear wheel 6 and suspension system or shock absorber 7 while the ridden vehicle 1 is in operation. The combined component drive enclosure 8 may provide for a modular construction and maintenance system of the vehicle 1 reducing the cost and/or simplifying construction and maintenance of the vehicle 1. The drive enclosure 8 may be adapted to have a liquid tight seal between the inner drive enclosure 11 and outer drive enclosure 18 so as to be capable of housing fluid and/or lubricant, such as oil, and, therefore, provide permanent lubrication and cooling for the drive chain or belt 29 and sprockets 27 and 28, increasing the longevity of the drive chain or belt 29 and sprockets 27 and 28, and increasing the time period between maintenance intervals for the drive chain or belt 29.

The presently disclosed ridden vehicle 1 having a motor assembly 3 having an output shaft 4 attached the main chassis frame 2 and having a monocoque structural drive enclosure 8 having a pivot point aligned with the output shaft 4 of the motor assembly 3, provides for a ridden motorized vehicle 1 having reduced unsprung weight, allowing the rear wheel 6, drive enclosure 8, and rear shock absorber 7 to react with the irregularities and undulations in the ground surface, absorbing the vibrations, such that the rider and/or passenger experience less vibration through the main chassis frame 2 of the vehicle 1, giving improved ride quality and reduced road noise. Such a ridden vehicle 1 also having reduced complexity of manufacture and maintenance of the swingarm or drive enclosure 8, which can provide for reduced costs of maintenance and manufacture of the vehicle 1. Reduced weight of the vehicle 1 provides for improved fuel economy and performance compared to a ridden vehicle having a higher weight with a similar motor or motor assembly system.

Another embodiment of the presently disclosed ridden vehicle 1 may be a motor scooter having a motor assembly 3 disposed on the main chassis frame 2, or comprising part of the main chassis frame 2, while also having a flat foot board 39 (as shown in FIG. 1), having a step-through construction. Therefore, such a ridden vehicle 1 provides a vehicle 1 having reduced unsprung weight while providing the step-through convenience of traditional motor scooters which have the motor assembly disposed on the rear wheel axle, thus maintaining the attraction of the motor scooter to both men and women alike, while providing improved performance and ride quality. Such a construction, having a greatly reduced unsprung weight allows the rear wheel 6 and suspension system 7 to move with the irregularities and undulations of the ground upon which the ridden vehicle 1 is being ridden. This allows the rear wheel to maintain traction with the ground while going over irregularities and undulations in the ground, and therefore provides a motor scooter with an improved ride quality, performance and reduced road noise.

This written description uses examples to disclose the invention and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A ridden vehicle comprising:
a frame;
a motor assembly attached to the frame, the motor assembly having an output shaft;
a drive enclosure having a first end and a second end, the first end having a frame connection point aligned with the output shaft of the motor assembly, and the second end having a wheel connection point, the drive enclosure adapted to pivot about the frame connection point;
a wheel connected to the wheel connection point at the second end of the drive enclosure;
a linkage apparatus disposed between the output shaft of the motor assembly and the wheel connected at the second end of the drive enclosure, the linkage apparatus adapted to transfer power from the output shaft of the motor assembly to the wheel.

2. The ridden vehicle as claimed in claim 1, wherein the motor assembly comprises a motor and at least one gear.

3. The ridden vehicle as claimed in claim 1, wherein the linkage apparatus between the output shaft of the motor assembly and the wheel is a chain.

4. The ridden vehicle as claimed in claim 1, wherein the linkage apparatus between the output shaft of the motor assembly and the wheel is a belt.

5. The ridden vehicle as claimed in claim 1, wherein the linkage apparatus between the output shaft of the motor assembly and the wheel is a drive shaft.

6. The ridden vehicle as claimed in claim 1, further comprising a tensioner mounted in the drive enclosure and adapted to exert a tension force to the linkage apparatus.

7. The ridden vehicle as claimed in claim 1, wherein the frame further comprises a removable motor assembly mount portion.

8. The ridden vehicle as claimed in claim 1, further comprising a second drive enclosure, disposed on an opposite side of the ridden vehicle from the drive enclosure, the second drive enclosure having a first end and a second end, the first end of the second drive enclosure having a frame connection point aligned with the output shaft of the motor assembly, and the second end of the second drive enclosure having a wheel connection point, the second drive enclosure adapted to pivot about the frame connection point.

9. The ridden vehicle as claimed in claim 1, further comprising shock absorber, the shock absorber disposed between the drive enclosure and the frame.

10. The ridden vehicle as claimed in claim 1, wherein the drive enclosure comprises a first part and a second part, the first part positioned inward of the ridden vehicle, adjacent the rear wheel, the second part positioned outwardly and fastened to the first part, opposite the rear wheel.

11. The ridden vehicle as claimed in claim 1, where the drive enclosure is a monocoque drive enclosure.

12. The ridden vehicle as claimed in claim 1, wherein the ridden vehicle is a motor scooter.

13. The ridden vehicle as claimed in claim 1, wherein the ridden vehicle is an electric scooter.

14. The ridden vehicle as claimed in claim 1, wherein the ridden vehicle is a hybrid scooter.

15. The ridden vehicle as claimed in claim 1, further comprising:
   at least one first sprocket attached to the output shaft of the motor assembly; and,
   at least one second sprocket attached to the rear wheel axle, the linkage disposed between the first sprocket and the second sprocket.

16. The ridden vehicle as claimed in claim 1, wherein the drive enclosure is disposed between the frame and the rear wheel on a single side of a ridden vehicle.

17. A drive enclosure for a ridden vehicle, comprising:
   an inner drive enclosure disposed between a ridden vehicle frame and a rear wheel of a ridden vehicle, the inner drive enclosure having a first end and a second end, the first end having a frame connection point, and the second end having a wheel connection point, the inner drive enclosure adapted to pivot about the frame connection point aligned with the output shaft of a ridden vehicle motor assembly; and
   an outer drive enclosure fastened to the inner drive enclosure.

18. The drive enclosure as claimed in claim 17, wherein the outer drive enclosure comprises a first end and a second end, the first end having a frame connection point, and the second end having a wheel connection point, the inner drive enclosure adapted to pivot about the frame connection point aligned with a ridden vehicle motor assembly output shaft.

19. The drive enclosure as claimed in claim 17 wherein the inner drive enclosure and outer drive enclosure form a monocoque drive enclosure.

20. The drive enclosure as claimed in claim 17, wherein the drive enclosure is adapted to be disposed on a single side of a ridden vehicle between a frame and rear wheel of the ridden vehicle.

* * * * *